United States Patent [19]
Wheeler

[11] 3,941,923
[45] Mar. 2, 1976

[54] THERMAL IMAGING SYSTEM WITH REDUNDANT OBJECT SPACE SCANNING

[75] Inventor: Bryce A. Wheeler, Los Angeles, Calif.

[73] Assignee: Hughes Aircraft Company, Culver City, Calif.

[22] Filed: Apr. 1, 1974

[21] Appl. No.: 456,938

[52] U.S. Cl. ............... 178/6.8; 178/DIG. 8; 178/6; 250/330; 250/332; 250/334; 250/578
[51] Int. Cl.² . H04N 3/00; H01J 31/49; H01J 39/12
[58] Field of Search .......... 250/330, 332, 334, 578; 178/6, 6.8, DIG. 8

[56] References Cited
UNITED STATES PATENTS

| | | | |
|---|---|---|---|
| 3,508,051 | 4/1970 | Nichols et al. | 250/332 |
| 3,610,930 | 10/1971 | Lacy et al. | 250/332 |
| 3,723,642 | 3/1973 | Laakmann | 178/6 |
| 3,781,559 | 12/1973 | Cooper et al. | 250/334 |
| 3,786,269 | 1/1974 | Cooper | 250/332 |
| 3,804,976 | 4/1974 | Gard | 250/334 |

Primary Examiner—Richard A. Farley
Assistant Examiner—S. C. Buczinski
Attorney, Agent, or Firm—W. H. MacAllister; Lawrence V. Link, Jr.

[57] ABSTRACT

A thermal imaging system having a scan generator for optically scanning a field of view in a two dimensional interlaced object space scan pattern; and for applying received thermal energy to an array of detector elements having a geometrical configuration relative to said scan pattern, such that each detector element views every point in the field of view during each scanning frame. The detector output signals are applied to a light emitting diode array so that each detector element is electrically coupled to a corresponding light emitting diode whose angular location within the diode array corresponds to the angular location of the associated detector within its array; and the resultant visible light is processed through the scan generator to provide a two dimensional interlaced scan reconstruction pattern which is synchronized with the object space scan pattern.

7 Claims, 10 Drawing Figures

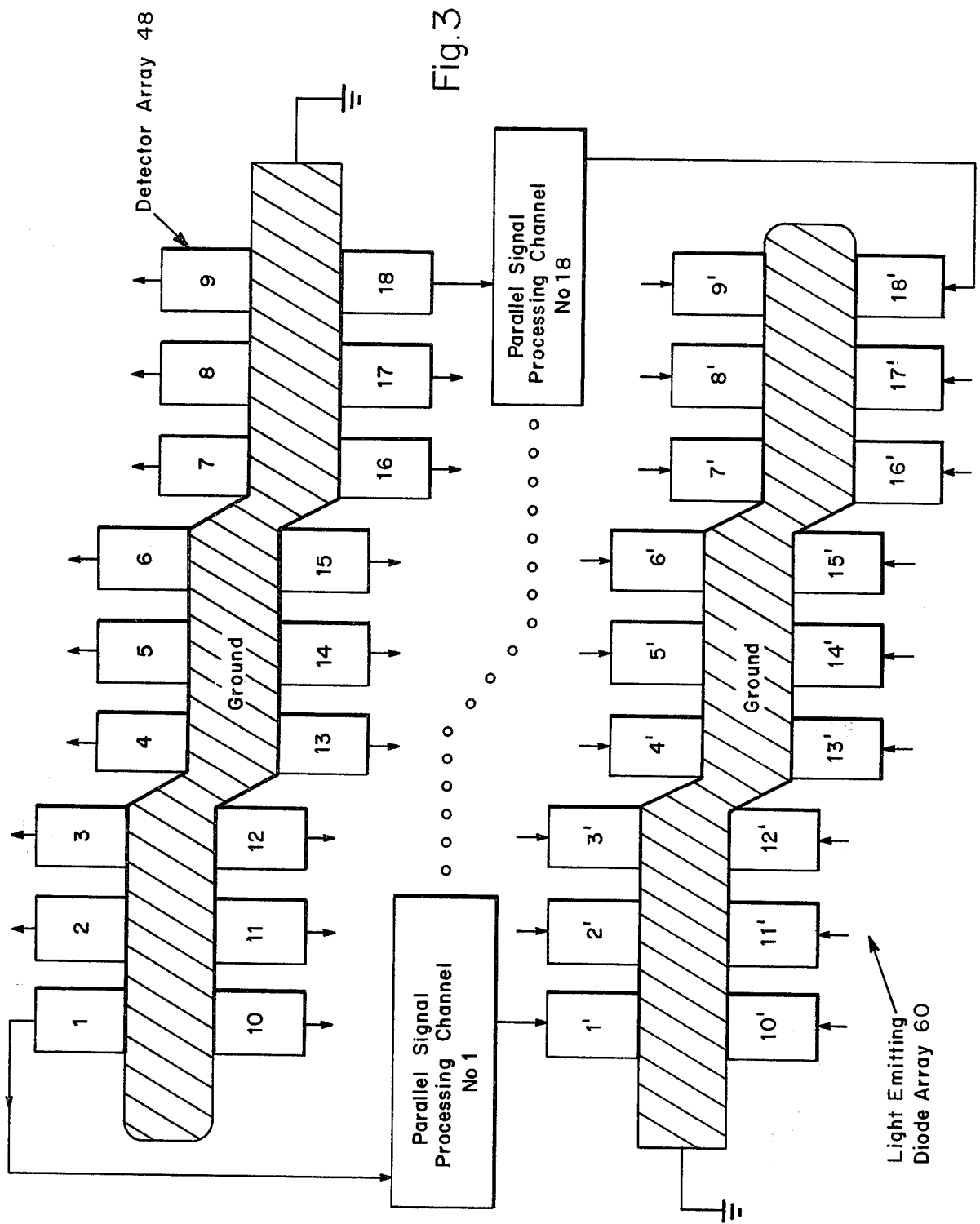

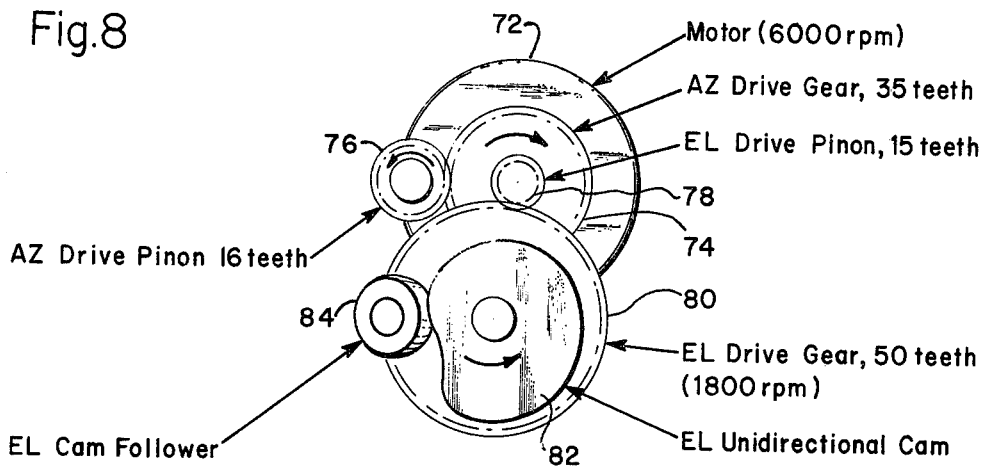
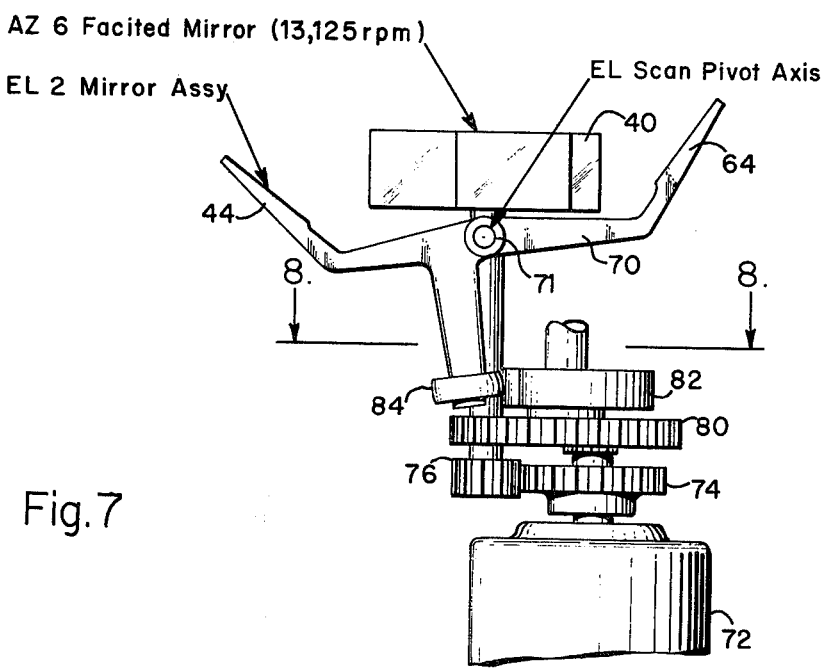

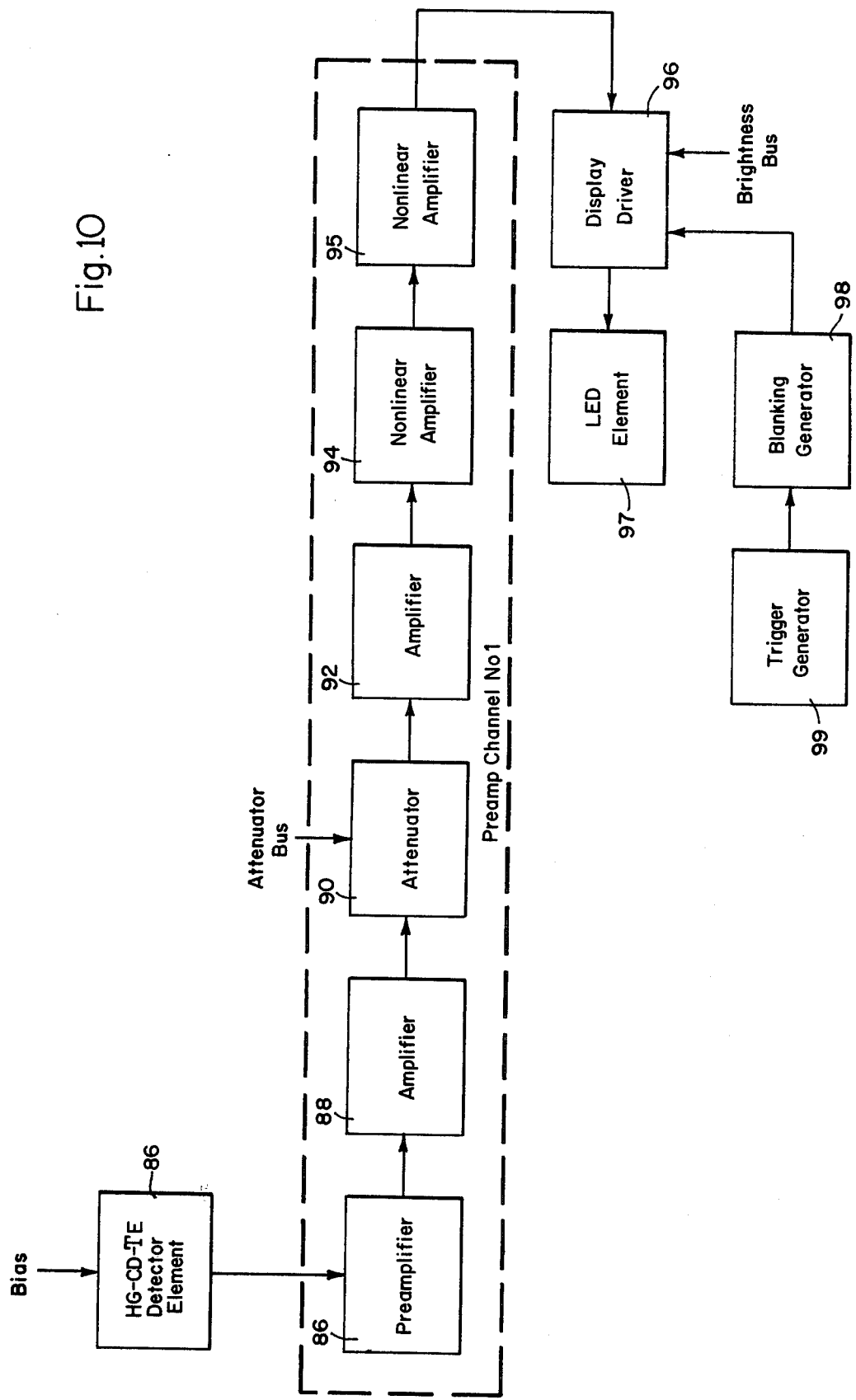

THERMAL IMAGING SYSTEM WITH REDUNDANT OBJECT SPACE SCANNING

BACKGROUND OF THE INVENTION

This invention relates generally to systems for providing imagery in the visible portion of the optical spectrum from thermal energy radiated from within a field of view.

Thermal imaging systems with detector and light emitting diodes (LED) arrays operatively associated with a single scan generator are known; and one such system is described in U.S. Pat. No. 3,626,091. This type of thermal imaging system, sometimes referred to as the "parallel-scan" type of system, is quite suitable for many applications. However, as performance requirements, e.g., range, resolution and field of view, are increased certain problems resulting from the fact that in such systems different detector elements exclusively view associated portions of the field of view, and that a relatively large number of detectors are required to scan the field of view with a "low-order" interlaced scan pattern. For example, the systems signal to noise ratio (S/N), field of view and detector configuration are so interrelated that design flexibility is restricted. Further, since each detector must drive a separate signal processing channel and many detectors are required, the addition of desirable but sophisticated signal processing techniques can become quite costly since they must be reproduced in many channels. Such signal processing techniques might include, for example, flare suppression circuits, DC restoration circuits; and variable aperture correction means. Further, since a primary requirement for good viewability is response uniformity, matching the responsivity of the various channels on a continuous basis and keeping the number of "dead end" channels to a minimum, is highly desirable with parallel-scan type systems. This restriction on the tolerable number of "dead channels" imposes a severe yield problem on detector manufacture as well as a problem in system maintainability. Yet another disadvantage of parallel-scan systems is that efficient detector cold shielding is difficult to achieve because of the large field of view subtended by the large detector array normally associated with such systems.

Many of the above described problems were resolved by the improved mechanization described in U.S. Pat. No. 3,723,642 which allows high performance levels to be reached with a drastic reduction in cost. In accordance with the just cited patent, a field of view is optically scanned in a two dimensional pattern by each element of a linear detector array. Output signals from each detector element are delayed as a function of the scan rate and the relative position of the element in the array to allow for the summation of signals from the same image segment provided by the various elements of the array. The approach of the just cited patent provides system simplicity relative to the parallel-scan technique; however, electronic processing is required so that the output from each of the detector elements may be superimposed and a single output signal suitable for processing by remote electronic type display unit is provided.

SUMMARY OF THE INVENTION

The subject invention avoids the above discussed problems inherent in the parallel-scan approach while at the same time not requiring the time delay processing of U.S. Pat. No. 3,723,642.

In accordance with the invention thermal imaging systems are provided wherein a scan generator optically scans a field of view in a two dimensonsal object space interlaced scan pattern and applies the received thermal energy to an array of detector elements having a geometrical configuration, relative to the scan pattern, such that each detector element views every point in the field of view during each scanning frame period. The detector output signals are applied to a light emitting diode (LED) array, having the same angular geometry as the detector array, such that each detector element is electrically coupled to a light emitting diode whose location in the LED array corresponds to the location of the associated detector in its array. The resultant visible light produced by the LED array is processed through the same scan generator to provide a two dimensional reconstruction image scan pattern such that the object space and image reconstruction scan patterns are synchronized; and whereby the visible light transmitted during one frame period comprises a number of registered pictures, each of which is indicative of the thermal energy distribution within the field of view and with the number of such pictures corresponds to the number of detector element and light emitting diode pairs.

In accordance with one preferred embodiment of the invention, a novel afocal, non-astigmatic scan generator is incorporated. The scan generator includes an azimuth scan wheel adapted for rotation about a spin axis and a pair of elevation scan mirrors mounted for oscillation about an axis perpendicular to said spin axis. The elevation scan mirrors are disposed adjacent opposite faces of the azimuth drum wheel such that one elevation mirror functions in conjunction with the azimuth drum wheel to provide IR scanning of the field of view, while the second elevation mirror operates in conjunction with the azimuth drum wheel to provide a visible light reconstruction of the thermal imagery. The elevation mirrors are disposed on opposite ends of a common yoke and are synchronously driven in an opposite phase relationship to provide an improved dynamic drive and optical-mechanical arrangement within the overall system.

It is therefore a primary object of the subject invention to provide an improved, cost effective thermal imaging system.

Another object is to provide direct display type thermal imaging systems which are relatively uncomplicated and which have improved reliability.

Still another object is to provide a versatile thermal imaging technique whereby resolution considerations do not necessarily control field of view and raster scan rate design parameters.

Another object is to provide thermal imaging systems wherein there is no need to match channel responsivity, and detector assemblies can be selected solely on the basis of cumulative detectivity.

Another object of the invention is to provide thermal imaging systems wherein the instantaneous field of view covered by the entire detector array is relatively small so as to allow more efficient cold shielding and reduced dewar cooling requirements.

Still another object of the invention is to provide high resolution thermal imaging systems wherein the number of separate signal processing channels may be kept to a relatively small number so as to allow the implementation of sophisticated processing circuits, if desired, at a reasonable cost.

BRIEF DESCRIPTION OF THE DRAWINGS

The novel features of the invention, as well as the invention itself, will be better understood from the following description taken in conjunctions with the accompanying drawings in which like referenced characters refer to like parts and in which:

FIG. 3 is a block diagram of detector and light emitting diode arrays suitable for use in the system of FIG. 1, for illustrating the geometrical similarity between the arrays and the signal processing therebetween;

FIG. 7 is a schematic side elevational view of a portion of the scan generator shown in FIG. 1 for illustrating the drive arrangement thereof;

FIG. 8 is a cross-sectional view along line 8—8 of FIG. 7;

FIG. 10 is a block diagram of one detector, light emitting diode processing channel suitable for use in the system of FIG. 1.

DESCRIPTION OF THE PREFERRED EMBODIMENT

Figure 1:
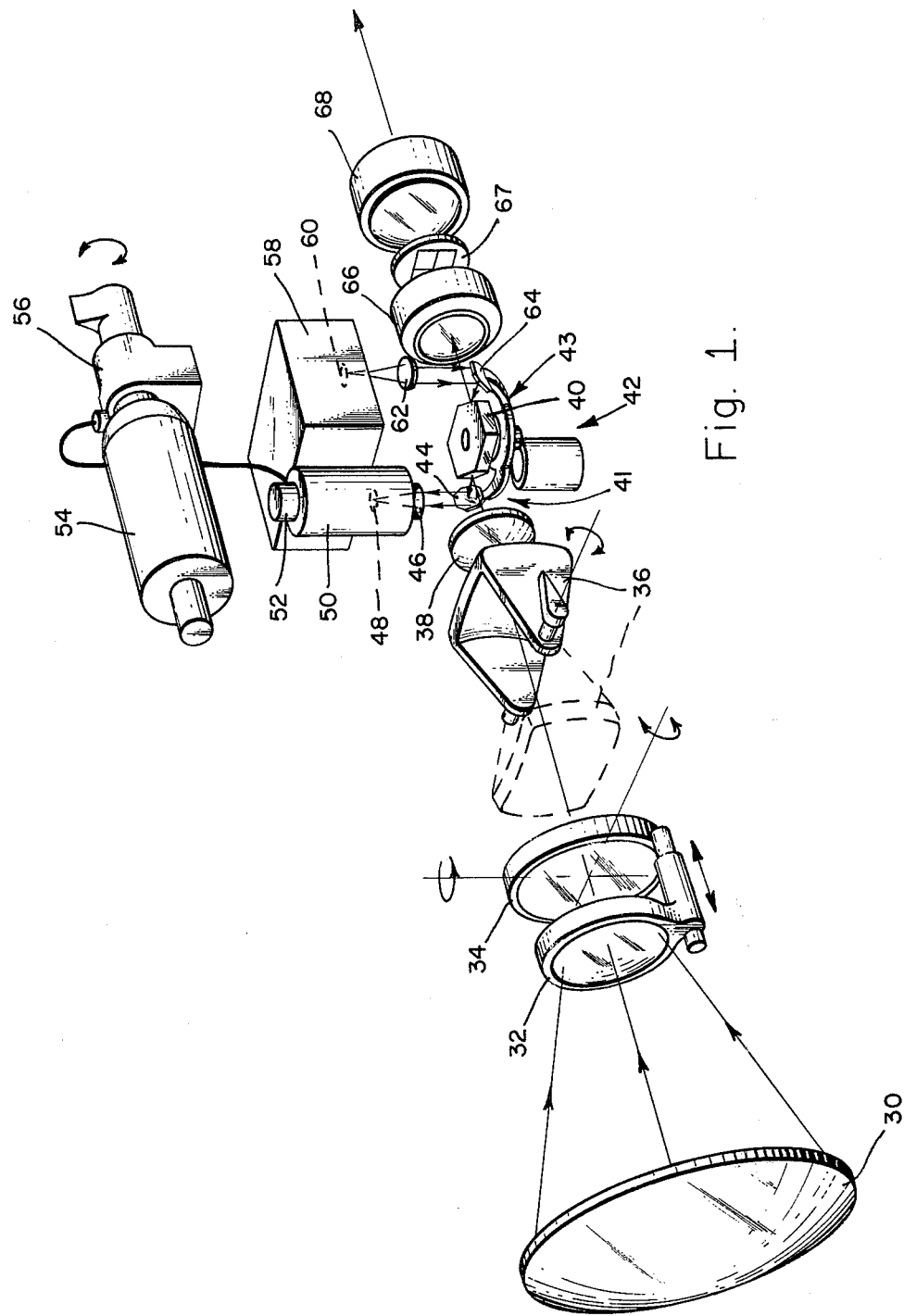
FIG. 1 is a block diagram of one preferred embodiment of a thermal imaging system in accordance with the subject invention.

Referring first primarily to FIG. 1, IR objective element 30 receives thermal (infrared) energy and transmits it through a focusing lens 32 and a boresight prism 34 to a field switch lens 36. Field switch lens 36 is shown in solid line in one of its two positions and in dashed line in the other of its two positions and is pivotably mounted for rotation between the two positions. In one position on the lens (dashed line) the receiving telescope has a narrow field of view whereas in the other position (solid line) it has a wide field of view. In either of the field switch positions the received radiation is next transmitted to an infrared relay lens 38 and thence onto an azimuth scan wheel or drum 40 of a scan generator 42.

The thermal energy reflected from a facet of scan wheel 40 is applied to an elevation mirror 44 and is reflected therefrom to a detector lens 46 which focuses it upon a detector array 48 located within a dewar assembly 50.

Dewar assembly 50 is cooled by operation of a cryostat unit 52 which is supplied with operating gas from a bottle 54 through a cryovalve 56.

Figure 2:
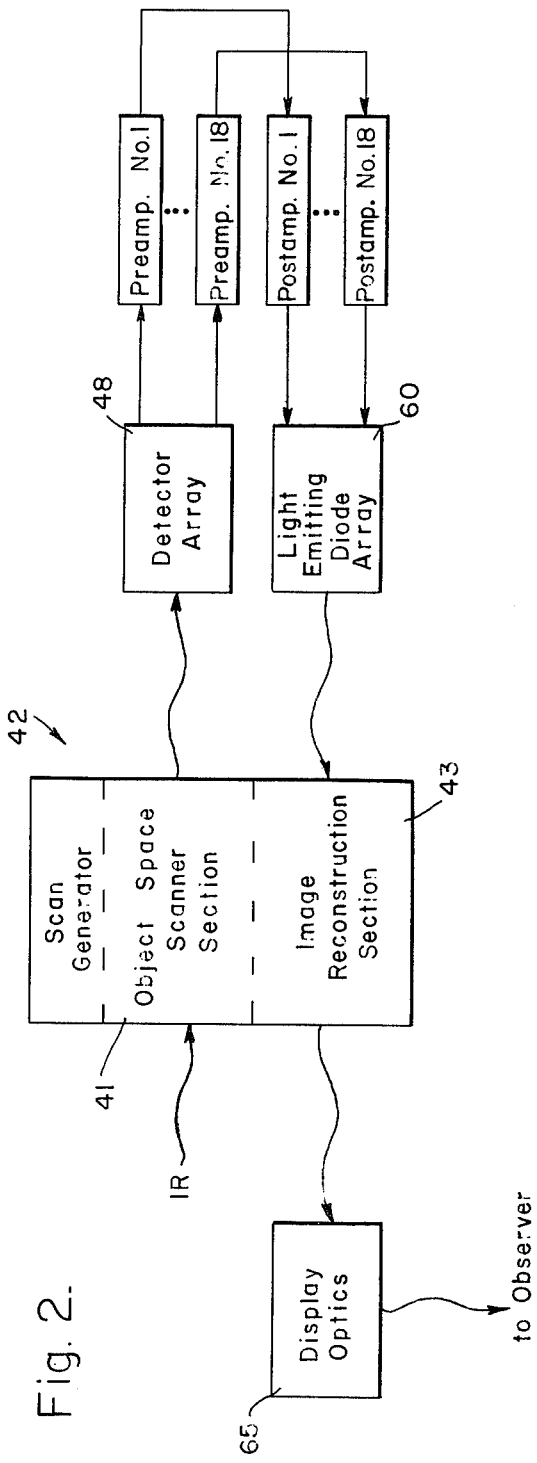
FIG. 2 is a functional block diagram of the thermal imaging system of FIG. 1.

The output signal from each detector element of array 48 is processed, in parallel, by electrical assembly 58 and then drives a corresponding light emitting diode (LED) of a LED array 60. The light beam produced by LED array 60 is collimated by lens 62 and is then reflected from elevation scan mirror 64 to an adjacent facet of azimuth scan mirror 40. After reflection from the facet, the light enters a visible optics train which comprises lenses 66, 67 and 68 which transmits the light to a viewer or to an image conversion system such as a vidicon unit (not shown). Element 67 might comprise a reticle pattern etched on a field lens, for example. The system of FIG. 1 is shown in block diagram form in FIG. 2, to which reference is now primarily directed. As there shown, scan generator 42 comprises an object space scanner section 41 and an image reconstruction section 43. Object space scanner section 41 scans a field of view in a two dimensional scan pattern such that a preselected number of interlaced scans are provided during each scanning frame period, for example, four interlaced fields per frame. The received thermal energy is applied to array 48 of infrared detector elements. The output signal from each detector element is processed by an associated preamplifier and post-amplifier channel and is then applied as a control signal which modulates the visible light emitted by an associated light emitting diode of LED array 60.

The individual elements of array 48 (see FIG. 3) form a preselected geometrical configuration which is designed such that each detector element receives thermal (infrared) energy from each point within the scan field of view during each scanning frame period. Each of the light emitting diodes (LED) of LED array 60 has the same angular geometry relative to their array as the associated (driving) detector element has with respect to detector array 48.

Figure 9:
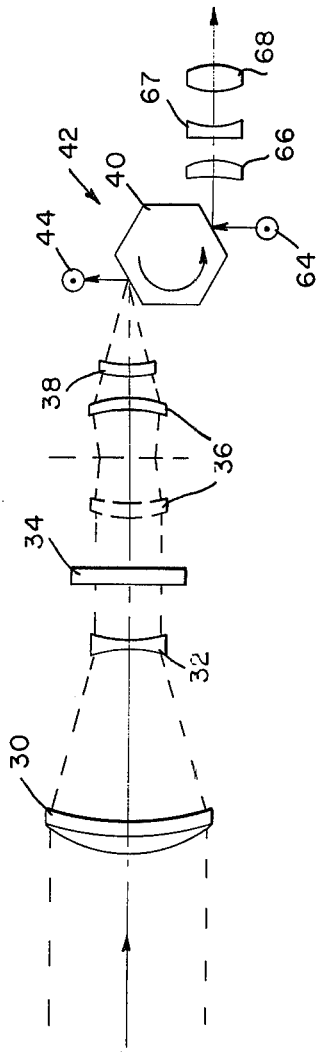
FIG. 9 is a perspective schematic of the optical and scan generator elements of the system of FIG. 1.

The light beam produced by LED array 60 is transmitted through image construction section 43 of scan generator 42 and then through display optics 65 to an observer or an image converter unit (not shown). As will be described hereinafter relative to FIGS. 7 through 9, object space scanner section 41 and imagery construction section 43 of scan generator 42 are implemented such that the object space and image reconstruction patterns are synchronized and non-astigmatic. Hence the light transmitted from image reconstruction section 43 comprises a number of registered pictures, each of which is indicative of the thermal energy distribution within the scanned field of view and the number of such pictures corresponds to the number of detector element and light emitting diode pairs.

One preferred embodiment of detector array 48 and light emitting diode array 60 is shown in FIG. 3 to which reference is now primarily directed. As there shown, array 48 comprises six groups of three detectors each. The detectors comprising a given group are substantially aligned along the direction of azimuth scan and the various groups are displaced along a direction (elevation scan) perpendicular to that of the azimuth scan. A 50 percent "over scan" is provided by the configuration of FIG. 3. For example, the lower one-third portion of the detectors 1 through 3 is scanned by the same segment of the field of view as the upper one-third portion of detectors 4 through 6.

It is noted that in a configuration of FIG. 3 each of the detectors within a given group are aligned with the azimuth scan direction and hence the system is readily adaptable to the incorporation of the time delay integration processing techniques described in the above cited U.S. Pat. No. 3,723,642. In such an implementation the output signals from each of the detector elements within a given group would be processed in accordance with the time delay integration technique. The resultant composite signal could be either feed a LED array wherein one light emitting diode would be associated with each of the detector groups, or the resultant composite signal from each group could be parallel to serial scan converted and applied to a remote display unit.

Figure 4:
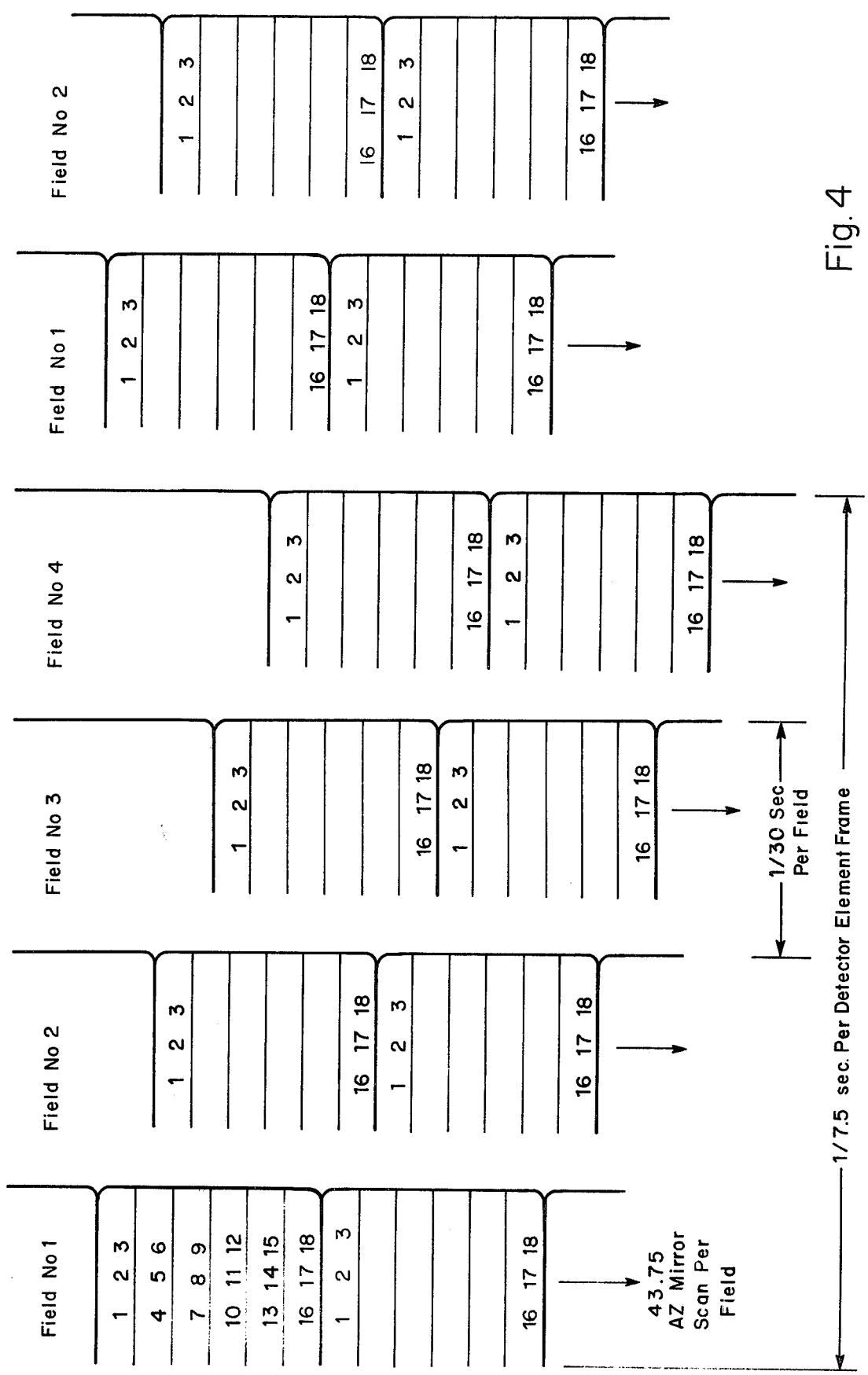
FIG. 4 is an object space and display scanning format diagram useful for explaining the interlaced scanning technique utilized in the system of FIG. 1.

The scanning format for the 18 element detector array illustrated in FIG. 3 is depicted in FIG. 4. During each azimuth scan line the array is translated along the elevation (transverse to the azimuth scan direction) by the width of the detector array in the elevation direction. It is noted that the detector array is of course physically stationary and is optically scanned by generator 42 and that the above terminology of "translating the array" is used for the purpose of simplifying the conceptual explanation of the operation of the system. In the illustrated preferred embodiment, the drive ratio between the azimuth scan wheel and the elevation scan structure is such that one scan field comprises 43.75 azimuth mirror facet scan periods or 262.5 (ignoring vertical retrace time) data lines, i.e., six groups of detectors times 43.75 azimuth mirror facet scans.

At the end of one scan field, i.e., a complete elevation format translation, the elevation scan structure is indexed such that scan field number 2 is translated downward by 1½ lines and is thus interlaced with the scan lines of the preceeding field.

In the illustrated preferred embodiment each field is completed in one-thirtieth of a second and is in the standard television format, i.e., it is equivalent to 262.5 lines per field and every two fields comprise 525 interlaced lines.

Following the completion of scan field number 2 the elevation scan structure is indexed so that the azimuth scans for field numbers 3 are commenced at a point which is translated downward 1½ lines from the starting point of field number 2; and similarly field number 4 is commenced at a point that is translated downward 1½ lines from the start of field number 3.

The completion of field number 4 completes a "detection scan frame," sometimes hereinafter referred to a "scanning frame period" and the just described sequence of four interlaced fields per frame is continuously repeated. It is noted that the term "frame" as used hereinafter refers to a group of consecutive fields, for example, four fields in the illustrated embodiment, during which each detector element "views" the entire space object field of view. It is noted that the illustrated embodiment of four fields per frame has proven to be a good compromise between a frame line sufficiently short so to allow retention by the viewer of the overall picture provided from each detector, LED pair; while at the same time conserving scan generator motor power and processing channel bandwidth requirements.

The "overlap" between the coverage of different detector groups, such as between the groups comprising detectors 1 through 3 and 4 through 6 (see FIG. 3) is not illustrated in FIG. 4, nor is the displacement between groups along the direction of scan. These last two features were not included in the illustration of FIG. 4 solely to improve the clarity of that figure relative to the explanation of the scanning format.

The non-astigmatic and non-image rotating raster image scan provided by the scan generator, for both optic space scanning and image reconstruction is a substantial contributor to the overall excellent performance of the subject invention. One suitable such scan generator is disclosed in my copending U.S. patent application, Ser. No. 362,593 filed May 21, 1973 and entitled "Receive and Display Optical Raster Scan Generator." The preferred embodiment of scan generator 42 disclosed herein is an improvement to the scan generator of my just cited patent application, which improvements will now be disclosed with reference primarily directed to FIGS. 5 through 9. In the description of scan generator 42, the scanning of a raster line horizontally is sometimes referred to as an azimuth scan and the vertical indexing scan from raster line to raster line is described as an elevation scan. It will, of course, be understood that these are relative terms used merely to denote two orthogonal axis which are at right angles relative to each other and that no connotation of the absolute orientation of the system is intended.

Figure 5:
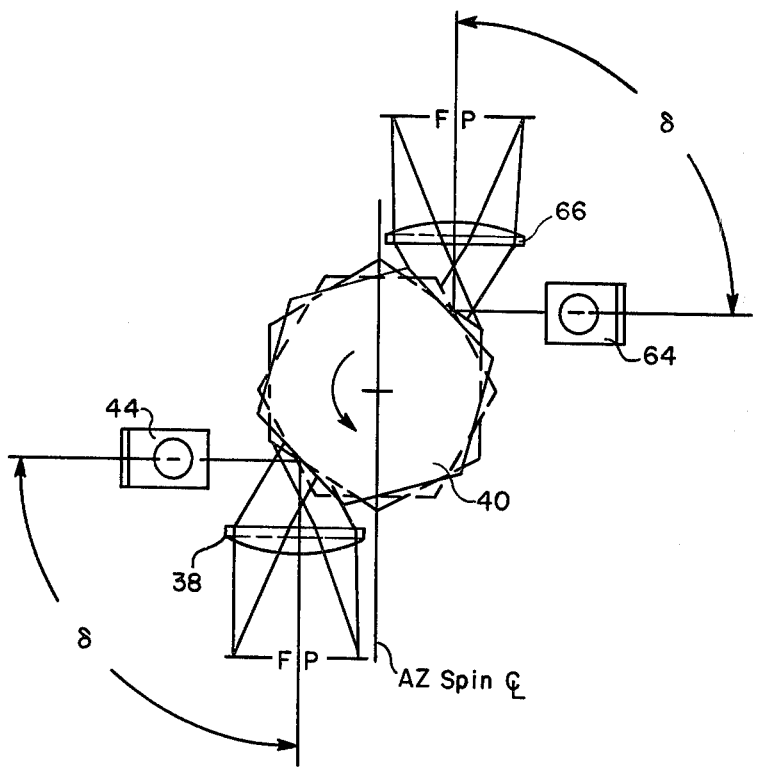
FIGS. 5 and 6 are top plan and schematic side elevation views, respectively, of a portion of the scan generator shown in FIG. 1.
Figure 6:
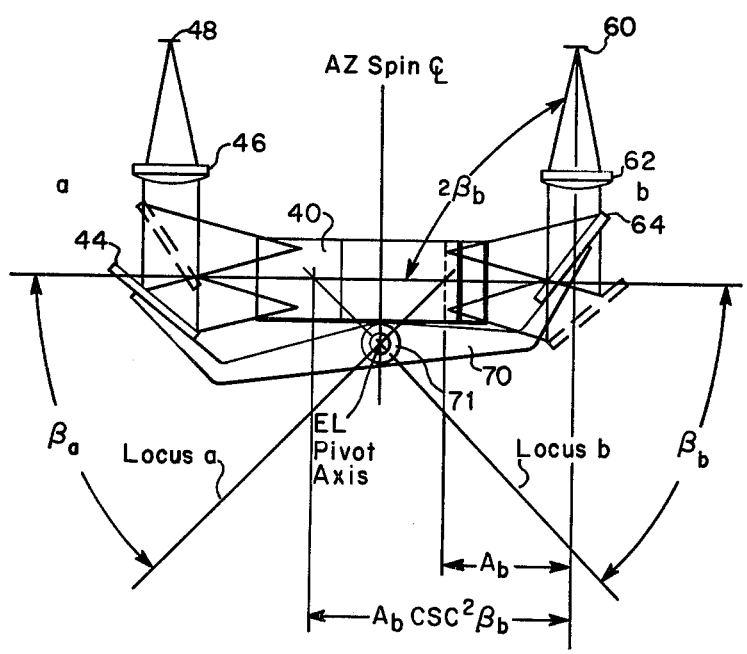

As illustrated in FIGS. 5 and 6, received infrared energy is reflected from azimuth drum wheel 40 and elevation scan mirror 44, through lens 46 to IR detector ray 48. The visible light produced by LED array 60 is transmitted through lens 62 and is then reflected from elevation scan mirror 64 and azimuth scan wheel 40 to the visible optics output train.

Multi-faceted azimuth scan wheel 40 is adapted for spinning about an azimuth axis (which is here shown to lie in the vertical direction) and scan wheel 40 comprises an even number of mirror faces which are substantially uniformally space angularly about the azimuth spin axis and parallel to the azimuth spin axis. The size, shape and geometrical location of the beam reflected from the mirror surfaces in the receiving path is defined by the aperture and field stops of the objective lens system which typically includes telescopic magnification. The nominal point of rotation of the fixed beam generated by the rotating mirror surface is referred to herein as "the pupil" and is located normal to the mid-field optical center line and is centered on each of the reflecting mirror surfaces of the azimuth scan wheel when mid-field surface is normal to the mid-fiedl optical center line. The pupil is the point of fixed area from which both azimuth and elevation scans appear to originate.

Elevation scan mirrors 44 and 64 are mounted on opposite ends of a pivotably mounted yoke 70 such that elevation scan mirror reflective surfaces 44 and 64 are in an opposed parallel relationship to each other and are disposed on opposite sides of azimuth scan wheel 40. The elevation scan generating mirror structure which includes yoke 70 is mounted for oscillation through angle about an axis parallel to a plane which is perpendicular to the azimuth spin axis and which is on a critical locus of centers. The position of the axis of rotation of the elevation scan generating mirror structure is critical in locating the "pupil" to contain the apparent substantially fixed point of origin of scan of the beams in elevation and azimuth.

In my above cited copending U.S. patent application two continuous portions of a single elevation mirror mounted on an arm pivoted at its end about an elevation pivot axis were used to illustrate the general case elevation scan arrangement. In the improved scan generator of FIGS. 5 through 9 of the subject application separate elevation mirrors 44 and 64 are mounted on the opposite ends of yoke 70 which is formed by two arms that are integrally joined at the elevation pivot point. However the optical principles and design instructions presented in my above cited U.S. patent application are equally applicable for defining the elevation pivot point of the improved scan generator disclosed herein and the designation for the various angles and optical center lines used in description of my above cited U.S. patent application have been incorporated into FIGS. 5 and 6 herein. It is noted that the pivot point for yoke 70 of the improvement configuration disclosed herein must of course be a point lying at the intersection of the loci respectively associated with each of the mirrors 44 and 64.

The scan generator in accordance with the subject invention allows straight through sighting for the thermal imaging system which heretofore has been achieved only by the use of various ancillary folding mirrors, inverting prisms, and the like. This may be seen by momentarily referring to FIGS. 1 and 9 which illustrate how infrared radiation incoming through IR objective lens 30 is reflected from the azimuth scan wheel 40 onto elevation scan mirror 44; and the visible light produced by LED array 58 is reflected from elevation scan mirror 64 onto the opposite parallel face of azimuth scan wheel 40 and is then reflected therefrom in an output path through the elements 66, 67 and 68. The path of the visible light is a straight line parallel continuation of the input path of the IR energy and this allows telescopic observation or sighting with a minimum of ancillary optical elements. Also the embodiment of FIGS. 5 through 9, wherein the two elements scan mirrors are mounted on a yoke which is pivoted at a center, has advantages over the one elevation mirror structure arrangements wherein the single mirror is mounted on an arm pivoted at its end, in that the scan generator of the subject invention provides a better dynamic drive arrangement and a better optic-mechanical arrangement within a total thermal imaging system context. For example, the two elevation mirror arrangement of the subject invention wherein the receive and display elevation scan mirrors are driven in an opposite phase relationship not only eliminates the need for ancillary inverting prism but the fact that opposite quadrants of azimuth scan wheel 42 are used eliminates design constraints on the injection angle and permits a simpler mechanical arrangement leading to a larger scan angle.

The space scanning and display format of FIG. 4 is implemented by the drive arrangement shown in FIGS. 7 and 8 to which reference is now primarily directed. A motor 72, which might be adapted for operating at 6,000 rmp, for example, drives azimuth scan wheel 40 by means of an azimuth drive gear 74 and an azimuth drive pinion 76. The elevation scan generating mirror structure is oscillated about axis 71 by means of elevation drive pinion 78, drive gear 80 and unidirectional cam 82. Cam 82 drives a cam follower 84 which is mounted on a leg of yoke 70. The cam follower is maintained in operable contact with the cam surface by means of a spring arrangement (not shown). The gear ratios indicated on FIGS. 7 and 8 provide for 43.75 azimuth mirror facet scans per field, i.e., 43.75 azimuth mirror facets are scanned past an elevation scan mirror during the time period the elevation scan mirror makes one cycle. The four interlaced fields described with respect to FIG. 4 result from the fractional relationship between the azimuth and elevation cycles, i.e., it takes four fields before the same azimuth and elevation relationships are repeated.

The electrical processing portion of the subject invention will now be described with respect to FIG. 10 which illustrates one of eighteen identical parallel processing channels. The output signal from a detector 86, which is one of the eighteen detectors comprising array 48 (see FIG. 1) and which may be a HG-CD-TE type of solid state infrared detector, is supplied to a preamplifier unit 86. Preamplifier 86 may be a conventional transistor type having a differential input stage and feedback from its output to its input so as to create a current mode operation. The function of this stage is to amplify the weak current signal levels to a high enough voltage level so that further amplification can be accomplished without additional amplifier noise degradation. Amplifying stage 88 is similar to the preamplifier stage in that it is a differential stage driven from the positive input and uses simple resistive feedback to establish a selected value of gain such as a gain of 10, for example.

Attenuator state 90 comprises a simple resistive diode divider network such that the input signal is attenuated according to the AC impedance of the diode which in turn is controlled by the amount of DC current applied to the diode. Attenuator 90 could have a range of from 0 to 60 db, for example.

Amplifying stage 92 is similar to stage 88 and is followed by two identical stages 94 and 95 of nonlinear amplification. These stages provide linear performance for small signal inputs but become abruptly nonlinear for larger signals.

The output signal from nonlinear amplifier 95 is amplified within display driver 96 and then applied as a control signal to an LED element 97 which is one of the elements of array 60 (FIG. 1), and whose relative angular position within array 60 corresponds to the angular position of detector 86 in array 48. The display driver stage 96 also responds to a DC brightness control voltage which is utilized to control the image LED current and a blanking signal which turns off all LEDs during the "dead time" of the azimuth scan generator. Such blanking, while unnecessary from a system functional veiwpoint, does reduce power consumption. The blanking signals are obtained by means of capacitive pickoffs located near azimuth scan wheel 40 and since the spacing of the pickoffs determines the blanking period it is independent of the absolute motor speed.

To summarize the operation of systems in accordance with the subject invention, a two dimensional scan generator scans the space object field of view and the scene is dissected by an array of infrared detectors feeding individual amplifier channels. The amplified outputs from the detectors are then applied in parallel to a geometrically similar array of light emitting diodes. The visible light produced by the LED array is then imaged back through the same scan generator to provide an visible light output signal which is indicative of the relative thermal energy distribution within the scanned field of view. The one-to-one mapping of the IR detectors into the LEDs, coupled with the use of the same scan generator for scanning both the infrared object space and the LED image space insures that the displayed image is built up coherently independent of the exact configuration of the detector/LED arrays or the exact details of the scan. The use of paired arrays of detectors and LEDs allows great latitude in the design of the arrays to meet such criteria as ease of fabrication, opitical convenience, lead fan out, etc. The invention is not limited to the linear arrays but is adaptable to very broad classes of arrays. For example, circular arrays or arrays comprising a plurality of circular subarrays may be desirable in some applications. For example, the circular arrays have near ideal lead fan-out configurations with all leads running out from their respective detector elements radially.

Inherent in the subject invention are significant advantages in picture uniformity and tolerance for channel outages. Since each detector views each point in the space object field of view and the image is developed from the sum of all the detector outputs, channel to channel nonuniformity cannot cause line to line or region to region nonuniformity. For example, if half of the detector channels were to fail, systems in accordance with the subject invention would only suffer a reduction in the signal to noise ratio of $\sqrt{2}$. By way of contrast in conventional thermal imaging systems wherein the field of view is partitioned into as many regions as detectors and each detector scans only its region, the failure of half of the detector channels would cause loss of coverage of one half the field of view. Indeed in such prior art systems, even a few inoperative processing channels would produce a number of "dead lines" on the display which would be distracting to the viewer and no more than a few percentages of such "dead channels" would be considered acceptable.

The subject invention's insensitivity to inoperable channels is of tremendous benefit to the yield, and consequently the cost of detector and LED arrays. With the conventional parallel-scan systems, all but a few of the detector elements must be good to produce acceptable images, and usually 100 percent operability is required for those elements which cover the central portion of the field of view. However in accordance with the subject invention even 10 percent inoperable channels would cause no perceptible degradation of performance inasmuch as the only significant measure of detector performance is the accumulative detectivity. Not only is the actual number of good channels not of importance in accordance with the implementations of the subject invention but the distribution of such good channels within the array itself is immaterial and so an otherwise good array need not be rejected due to one or two centrally located dead channels. Similarly inoperable LED elements are not critical to the system's overall performance. Inoperative channels may be compensated for by merely designing the number of original channels to take into account the expected yield ratio of the detectors and LEDs.

Thus there has been disclosed a new and useful cost effective thermal imaging system which provides increases in performance and reliability.

What is claimed is:

1. A thermal imaging system comprising:
    a scan generator including scanning means for optically scanning a field of view in a two dimenensional scan pattern such that said scan pattern comprises a given number of interlaced scans of said field of view during each scanning frame period and for applying the received thermal energy to a first location, and imaging means for receiving visible light energy applied from a second location and transmitting said light energy in a two dimensional scene reconstruction pattern such that said scan and reconstruction patterns are synchronized;
    an array of detector elements disposed at said first location, with the individual elements of said array forming a given geometrical configuration such that each said detector element receives thermal energy from each point in said field during each scanning frame period, and with each detector element adapted for producing an output signal representative of the relative intensity of thermal energy applied thereto; and wherein said array of detector elements is comprised of groups of detectors with the detectors of each group being disposed along a first direction corresponding to one of said directions of optical scanning and with said groups being disposed along a second direction orthogonal to said first direction such that there is an overlap in the scanning of said groups during each optical scan along said first direction;
    an array of light emitting elements disposed at said second location with the individual elements of said array forming the same geometrical configuration as that formed by the elements of said detector array, and with each light emitting element adapted for producing visible light energy as a function of the value of a control signal applied thereto; and
    means for applying the output signal from each of said detector elements as the control signal to a corresponding light emitting element such that each detector element is electrically coupled to a light emitting element whose location in its array corresponds to the detector element's location in the detector array.

2. The thermal imaging system of claim 1 wherein each said group of detector elements comprises detector elements which are displaced uniformly along said first direction.

3. The thermal imaging system of claim 1 wherein said scan generator includes means for producing non-astigmatic synchronized space object scan and image reconstruction patterns suitable for use with an afocal magnifying system.

4. A thermal imaging system comprising:
    a scan generator including scanning means for optically scanning a field of view in a two dimensional scan pattern such that said scan pattern comprises a given number of interlaced scans of said field of view during each scanning frame period and for applying the received thermal energy to a first location, and imaging means for receiving visible light energy applied from a second location and transmitting said light energy in a two dimensional scene reconstruction pattern such that said scan and reconstruction patterns are synchronized, said scan generator providing non-astigmatic synchronized space object scan and image reconstruction patterns suitable for use with an afocal magnifying system, and including an azimuth drum wheel adapted for rotation about a spin axis, said drum wheel having an even number of mirror facets which are substantially uniformly spaced angularly about said spin axis and parallel thereto, an elevation scan generating mirror structure mounted for oscillation about an oscillation axis which is parallel to a plane which in turn is perpendicular to and displaced from said spin axis, said oscillating mirror structure comprising first and second mirror structures mounted on opposite ends of a pivotably mounted yoke, said mirror surfaces being in opposed parallel relationship to each other and on opposite sides of said drum wheel, and said yoke being pivoted at such a point that as said elevation scan generating mirror structure is oscillated and said azimuth scan wheel is rotated the orthogonally directed scans produced by said drum wheel and said first and second mirror surfaces appear to originate from substantially fixed first and second areas, respectfully, on surfaces of said azimuth scan wheel;

an array of detector elements disposed at said first location, with the individual elements of said array forming a given geometrical configuration such that each said detector element receives thermal energy from each point in said field during each scanning frame period, and with each detector element adapted for producing an output signal representative of the relative intensity of thermal energy applied thereto;

an array of light emitting elements disposed at said second location with the individual elements of said array forming the same geometrical configuration as that formed by the elements of said detector array, and with each light emitting element adapted for producing visible light energy as a function of the value of a control signal applied thereto; and means for applying the output signal from each of said detector elements as the control signal to a corresponding light emitting element such that each detector element is electrically coupled to a light emitting element whose location in its array corresponds to the detector elements's location in the detector array.

5. The thermal imaging system of claim 4 further comprising cam drive means for driving said yoke through cycles of oscillatory motion, azimuth scan wheel drive means for rotating said azimuth scan wheel, and means for synchronizing said cam drive means and said azimuth scan wheel drive means so that the period of the oscillatory cycles of the yoke and the rotational speed of said azimuth scan wheel are such as to provide said given number of interlaced scans of said field of view during each said scanning frame period.

6. The thermal imaging system of claim 5 wherein said array of detector elements comprises groups of detectors with the detectors of each group being disposed along a first direction corresponding to one of said directions of optical scanning and with said groups being disposed along a second direction orthogonal to said first direction such that there is an overlap in the scanning of said groups during each optical scan along said first direction.

7. The thermal imaging system of claim 6 wherein each said group of detector elements comprises detector elements which are displaced uniformly along said first direction.

* * * * *